June 14, 1949.   R. LEWTON   2,472,840
VALVE CONSTRUCTION
Filed Feb. 9, 1945   2 Sheets-Sheet 1
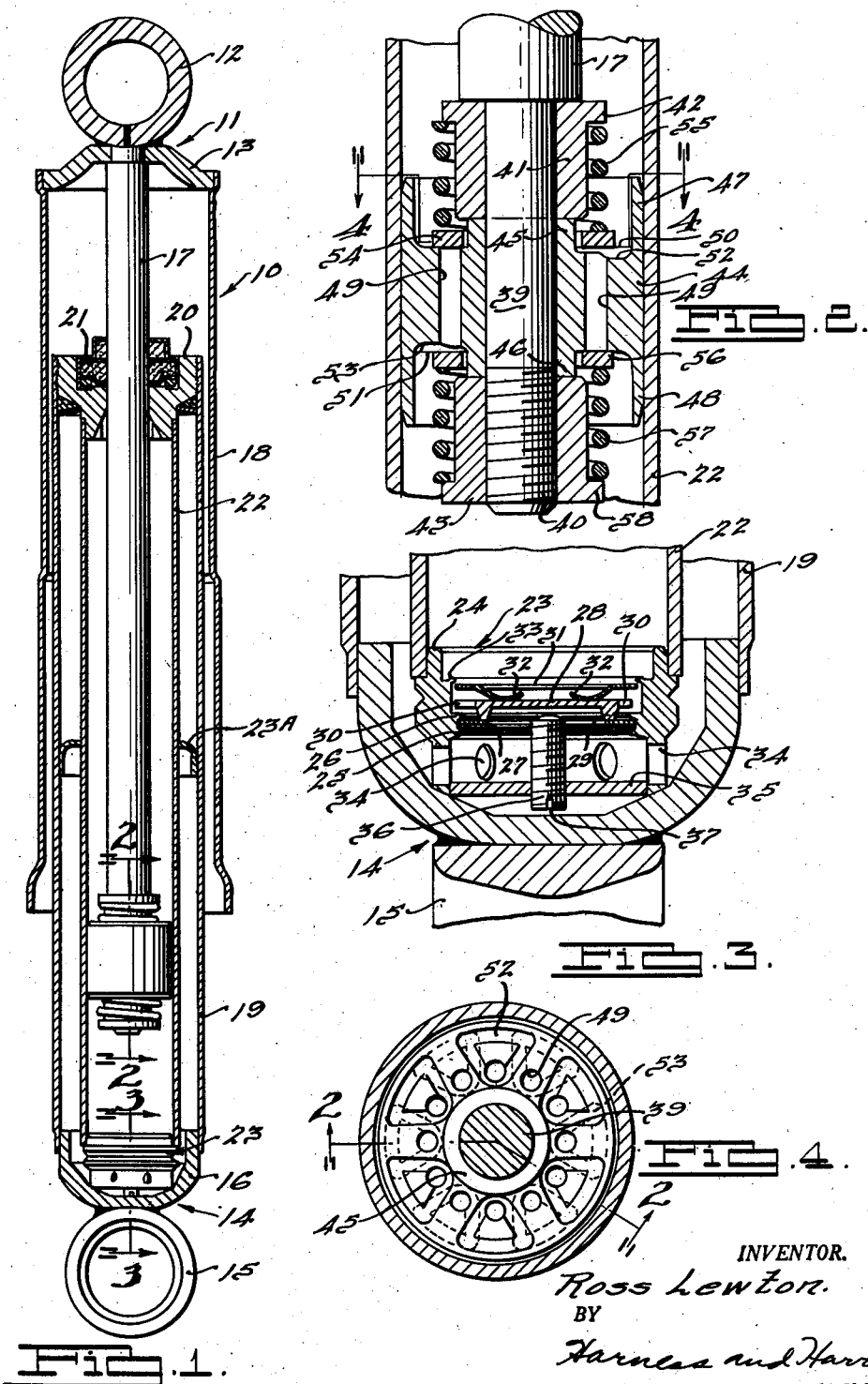
INVENTOR.
Ross Lewton.
BY Harness and Harris
ATTORNEYS.

June 14, 1949. R. LEWTON 2,472,840
VALVE CONSTRUCTION
Filed Feb. 9, 1945 2 Sheets-Sheet 2

INVENTOR.
Ross Lewton.
BY
Harness and Harris
ATTORNEYS.

Patented June 14, 1949

2,472,840

UNITED STATES PATENT OFFICE 2,472,840

VALVE CONSTRUCTION

Ross Lewton, Highland Park, Mich., assignor to Chrysler Corporation, Highland Park, Mich., a corporation of Delaware Application February 9, 1945, Serial No. 577,014

13 Claims. (Cl. 188—100)

This application relates to a valve construction. More specifically it relates to a valved piston intended for use in a shock absorber.

In certain valve constructions such as those of pistons for shock absorbers, two valves and two sets of passages are provided. One valve and one set of passages limit flow of fluid in one direction through the piston to above a certain pressure, and the other valve and other set of passages limit flow in the opposite direction to above another certain pressure. These pressures may be equal or nearly equal, or they may be much different in value. The two sets of passages are often arranged in non-overlapping rings, and this arrangement may constitute an unwanted limitation on the size of the passages and of the valve parts cooperating with the passages.

I propose a piston and valve construction that involves the use of a single ring of passages for flow in both directions. In a modified form I suggest the use of two rings of passages that at least have overlapping relationship.

An object of the present invention is to provide an improved valve construction that is capable of passing fluid in two directions at different pressures. This construction may find use in a piston of a fluid shock absorber.

Another object is to provide improvements in the arrangement of passages extending through a valve body. Such improvements may be applied to the arrangement of passages in a ring.

A further object relates to improvements in the shaping of valve bodies, such as the pistons of shock absorbers. The shaping may bring about a simplification in valve construction, such as, for example the arrangement of passages extending through the valve bodies and the valve parts cooperating with the passages. Smaller small valve parts may be used.

Other objects will appear from the disclosure.

In the drawings:

Fig. 1 is a longitudinal sectional view of a shock absorber employing a novel valve construction of the present invention;

Fig. 2 is a sectional view taken on the line 2—2 of Fig. 4;

Fig. 3 is a sectional view taken on the line 3—3 of Fig. 1;

Fig. 4 is a sectional view taken on the line 4—4 of Fig. 2;

Figure 5:
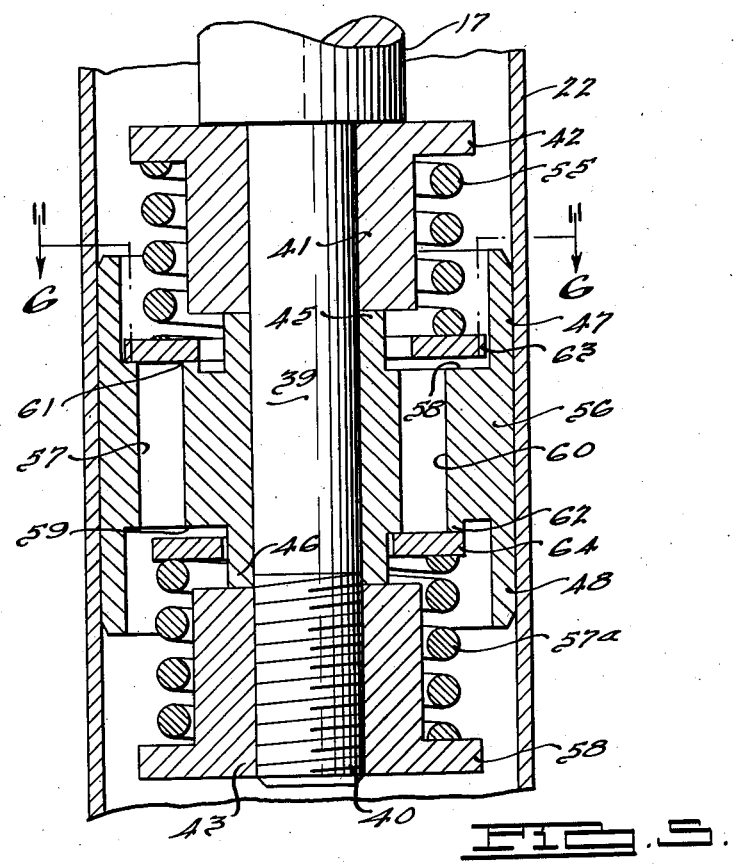
Fig. 5 is a sectional view similar to Fig. 2 showing a modified form of piston valve and taken on the line 5—5 of Fig. 6.

Reference character 10 designates a shock absorber of the present invention which includes an upper head 11 composed of a ring 12 and a disk 13 and a lower head 14 composed of a ring 15 and a cup 16. The disk 13 is joined to the ring 12 by soldering or welding and has an opening receiving the reduced end of a piston rod 17 in a welded or soldered connection. A tubular sleeve 18 is secured to the disk 13 by soldering or welding. The cup 16 is secured to the ring 15 by soldering or welding, and soldering or welding secures the lower end of a tubular sleeve 19 to the cup 16. The upper end of the sleeve 19 receives a bushing 20 in a threaded connection. The piston rod 17 has a sliding fit in the bushing 20 and is sealed by means of a seal 21 mounted in the bushing 20. The upper end of a sleeve 22 is press-fitted on the bushing 20, and the lower end is similarly secured to the compression valve structure 23. A baffle 23A is positioned in the space between the tubular sleeves 19 and 22.

The compression valve structure 23, which is best illustrated in Fig. 3 has a body 24, press-fitted in the lower end of the tubular sleeve 22 and resting within the base of the cup 16. The body 24 has a passage in the walls of which are formed lips 25 and 26 which hold the outer peripheries of a pair of deformable annular disks 27, which may be termed a resistance valve. For example, the lower lip 25 may be formed in the body 24 originally, and the upper lip may be formed by a peening operation after the disks 24 are in place on the lower lip 25. A cover part or inlet valve 28 has an annular bead 29 at one side and five outwardly extending short locating fingers 30, as seen in Fig. 3, serving to maintain the cover part 28 against excessive lateral movement in the passage in the body 24. A resilient means formed of a stamped ring 31 having two opposed inwardly extending fingers 32 depressed from the plane of the ring as shown in Fig. 3, lightly holds the rib 29 of the cover part 28 in engagement with the inner periphery of the one disk 27. A flange 33, peened from the valve body 24, holds the ring 31 in place. The body 24 has a plurality of side openings 34. A plate 35 is secured in the base of the body 24 and supports in threaded engagement a threaded adjustable stop 36, having an upper end adapted to be engaged by the cover part 28 in its downward movement and its lower end a slot 37, adapted to receive a screw driver for adjustment of the stop 36.

The piston rod 17 has a reduced end portion 39 which is threaded at its extremity as indicated at 40. Mounted upon the reduced end portion 39 is a tubular section 41 having a flange 42 at one end. A nut 43 engages the threaded extremity 40 of the reduced end portion 39 and clamps a piston 44 against the tubular section 42. The tubular section 41 and the nut 43 engage, respectively, an upper central raised portion 45 and a lower raised central portion 46 on the piston 44. The piston has upper and lower skirts 47 and 48 which combined with the central main portion of the piston gives the piston a sufficient length. The piston 44 has a plurality of parallel passages 49 spaced about the reduced end 39 on the piston rod 17. The piston has an upper face 50 and a lower face 51. A plurality of sector-like depressions 52 are formed in the upper piston face 50 at alternate openings 49. These depressions are indicated in full lines in Fig. 4. A plurality of sector-like depressions 53 are formed in the lower piston face 51 at the remaining alternate passages 49. The depressions 53 are indicated in dotted lines in Fig. 4. A comparison of the full lines and dotted lines representing the depressions in Fig. 4 will indicate that a depression 52 is formed at the upper face at one opening, a depression 53 is formed at the lower face at the next opening, a depression 52 is formed in the upper face at the next opening and so on. An upper valve ring 54 is seated upon the upper piston face 50 and is resiliently maintained in seated position by a coil spring 55 acting between the valve ring 54 and the flange 42 on the tubular section 41. A lower valve ring 56 is seated on the lower piston face 51 and is resiliently maintained in this position by a coil spring 57 acting between the lower valve ring 56 and a flange 58 on the nut 43. It will be seen from Fig. 2 that the upper valve ring 54 closes the upper ends of those passages 49 at which no depressions 52 are formed and leaves open the upper ends of the other passages 49 at which the depressions 52 are formed although the ring 54 completely overlies the latter openings 49. Similarly it will be seen from Fig. 2 that the lower valve ring 51 closes the lower ends of those passages 49 at which no depressions 53 are formed and leaves open the remaining passages 49 at which the depressions 53 are formed although the valve ring 56 completely overlies the latter passages 49. It will also be noted that with the valve rings 54 and 56 positioned as shown in Fig. 2, half of the passages 49 are closed at the upper end and opened at the lower end, and the other passages are open at the upper and closed at the lower end.

At the face 50, at which the depressions 52 are formed, the portions between the depressions are raised and so constitute elevated seating portions that surround those openings 49 at which the depressions 52 are not adjacent. Similarly, at the face 51, at which the depressions 53 are formed, the portions between the depressions are raised and so constitute elevated seating portions that surround those openings 49 at which the depressions 53 are not adjacent.

With the arrangement just described there is provided a single ring or circle of passages 49, and yet flow through the passages 49 may take place in two directions with appropriate action by the upper and lower valve rings 54 and 56. In operation of the shock absorber 10 there is fluid both above and below the piston 44. If a force is applied to the piston through the rod 17 tending to move the piston downwardly, downward movement takes place when pressure exerted is sufficient to raise the valve ring 54 from the upper piston face 50 against the action of the spring 55. As the piston 44 moves downwardly, fluid flows in through the depressions 53 and the passages 49 at which the depressions 53 are located and past the valve ring 54. When a force is applied to the piston 44 tending to move it upwardly, upward movement takes place when the pressure exerted in the fluid is sufficient to shift the lower valve ring 56 from the lower piston face 53. Then fluid flows through the depressions 52 and the passages 49 at which the depressions 52 are located and past the ring 56. Thus there are valves restricting the flow of fluid through the piston 44 in two directions and the flow takes place through the same circular ring of passages in both directions. The tubular section 41 and the nut 43 limit the movement of the valve rings 54 and 56 away from the piston faces 50 and 51.

One advantage in the use of a single-ring of passages 49 is that both ring valves 54 and 56 may be relatively small in outer diameter and size rather than, respectively, large and small, since the single row of passages may be relatively small in outer diameter. With two rings of passages one ring valve will be large. It has been discovered that the smaller the ring valve, the more satisfactory is its operation from the standpoint of lack of noise and ease of lifting from seating on the piston.

The rings 12 and 15 are to be suitably connected to parts not shown between which the shock absorber 10 is to operate. Fluid is located in tube 22 between the piston 44 and the compression valve 23, above the piston 44, and in the reserve chamber between tubes 19 and 22. When the rings 12 and 15 move toward one another the piston 44 moves downwardly in the tube or cylinder 22. The fluid tends to flow upwardly through the piston 44, and if this is to take place without much pressure as is frequently the case in shock absorber construction, the coil spring 55 is made relatively weak so that the upper valve ring 54 may be easily lifted from its seat on the upper piston face 50 thereby opening the upper ends of the passages 49 that were previously closed. When the rings 12 and 15 tend to move away from one another, the piston 38 tends to move upwardly in the cylinder 21. When the fluid pressure has reached a sufficient value, which may be considerably higher than that required for lifting of the upper valve ring from the upper piston face 50, the lower valve ring 56 is raised from the lower piston face 51. The coil spring 57 may be made relatively strong so as to permit lifting of the valve ring 56 only at this relatively great fluid pressure.

The compression valve 23 is claimed in the copending application of Herman C. Cuskie, Serial No. 570,306, filing date December 29, 1944. This valve serves the purpose of providing compensation for the change in total volume of fluid within the tubular member 22 between the valve 23 and the bushing 20, due to the piston rod 17. As the piston 44 moves downwardly toward the compression valve 23, the total volume for fluid in the sleeve 22 decreases since the available area for fluid above the piston is equal to the internal area of the tube 22 minus the area of the piston rod 17, whereas the area below the piston is equal to the internal area of the tube 22. Thus as the piston 44 moves downwardly, the valve 23 opens to permit the necessary escape of fluid. The increased pressure below the piston 44 causes the plate 28 to move downwardly, the discs 27 deforming with downward movement of the plate. When the plate 28 contacts the adjustable stop 36 the plate can move downwardly no farther and the fluid under pressure acts to deform the discs 27 further in a downward direction, and so the discs move out of contact with the plate 28 permitting escape of the fluid. When the piston 44 moves upwardly the volume for fluid within the tube 22 increases and the valve 23 opens to permit the necessary upward flow of the fluid. This takes place at a very low pressure since the valve plate 28 is easily moved out of contact with the discs 27 against the action of the relatively weak resilient means formed of the stamped ring 31 with its depressed fingers 32.

Figure 6:
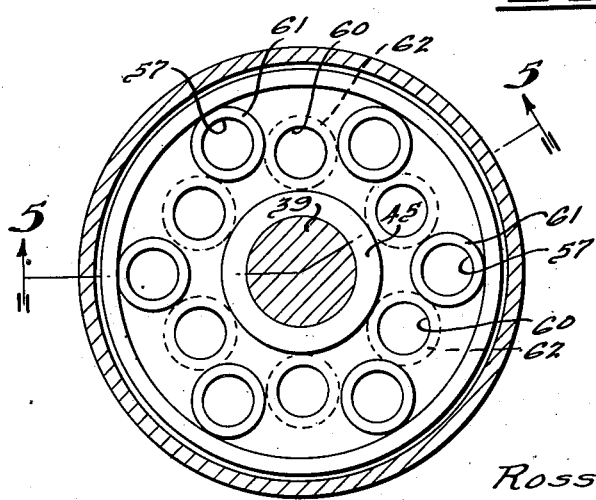
Fig. 6 is a sectional view taken on the line 6—6 of Fig. 5.

Figs. 5 and 6 show a piston 56 of a modified form. This piston is in many respects similar to the piston 44 of Fig. 2 in that it has an upper central raised portion 45, a lower raised central portion 46, and upper and lower peripheral skirts 47, 48. The piston 56 has a central opening through which extends the reduced portion 39 of the piston rod 17. The upper raised central portion 45 of the piston 56 engages one end of the tubular section 41, and the lower raised central portion 46 engages the nut 43 threaded upon the threaded portion 40 of the reduced end 39 on the piston rod 17. The piston 56 has an outer ring of openings 57 extending from one face 58 to an opposite face 59 and an inner ring of openings 60 extending between the faces 58 and 59. The openings 60 are alternately spaced between the openings 57 and the rings partially overlap one another. On the face 58 there are provided around the openings 57, raised annular seats 61. On the face 59 there are provided around the openings 60 raised annular seats 62. A valve ring 63 fits relatively closely within the skirt 47 and engages the annular seat 61, completely covering and closing the passages 57. As seen in Fig. 5 valve ring 63 is spaced from and only partially covers the openings 60, thus leaving them open. The valve ring 63 is yieldingly held in engagement with the annular seat 61 by the spring 55 acting between the valve ring 63 and the flange 42 on the tubular section 41. A valve ring 64 relatively closely fits the lower central raised portion 46 of the piston 56 and engages the annular seats 62, completely covering and closing the openings 60. The valve ring 64 is spaced from and only partially covers the openings 56, thus leaving them open. The valve ring 64 is yieldingly maintained in engagement with the annular seat 62 by the spring 57a acting between the valve ring 64 and the flange 58 on the nut 43. When the piston 56 is moved upwardly in the tube 22 the valve ring is lifted from the annular seat 62, and thus fluid flows past the valve ring 63, through the openings 60, and past the valve ring 64. When the piston 56 is moved downwardly in the tube 22, the valve ring 63 is raised from the annular seats 61, and so fluid flows past the valve ring 64, through the passages 57, and past the valve ring 63. It should be noted that since the valve ring 63 only partially covers the openings 60, there is opportunity for a straight flow of fluid past the valve ring 63 into the passages 60. Similarly, since the valve ring 64 only partially covers the passages 57, there is opportunity for straight flow of fluid past the valve ring 64 into the passages 57.

With the piston 56 of Figs. 5 and 6, a compression valve may be employed, which may take the form of the valve 23 of Fig. 3. The functioning of the compression valve is as previously described.

I claim:

1. A valve construction for a shock absorber, comprising a body having a plurality of parallel passages extending therethrough and arranged in a ring, a first set of V-shaped depressions formed in one face of the piston at certain alternate passages, and a second set of V-shaped depressions formed in the other face of the piston at the remaining alternate passages, a first valve ring engaging the said one face of the body so as to close the said remaining alternate passages and to lie within the limits of the first set of V-shaped depressions for leaving open the said certain alternate passages, means yieldingly holding the first valve ring in engagement with the first face of the body, a second valve ring engaging the said other face of the body so as to close the said certain alternate passages and to lie within the limits of the second set of V-shaped depressions for leaving open the said other alternate passages, and means yieldingly holding the second valve ring in engagement with the second face of the piston.

2. A valve construction comprising a valve body having a plurality of passages extending therethrough from one face to an opposite face, a first set of enlarged recesses at the ends of certain alternate passages at the said one face, and a second set of enlarged recesses at the ends of the remaining alternate passages at the said opposite face, a first valve ring engaging the said one face so as to close the ends of the said remaining alternate passages at the said one face of the valve body and so as to lie within the limits of the first set of enlarged recesses for leaving open the said certain alternate passages although completely covering them, means resiliently urging the first valve ring against the said one face of the valve body, a second valve ring cooperating with the said opposite face of the valve body, the said certain alternate passages, the second set of enlarged recesses, and the said remaining alternate passages, respectively, as the first valve ring with the said one face of the valve body, the said remaining alternate passages, the first set of enlarged recesses, and the said certain alternate passages, and means resiliently urging the second valve ring against the said opposite face of the valve body.

3. A piston construction comprising a rod having a reduced end and a shoulder between the reduced end and the remainder of the rod, a tubular section mounted upon the reduced portion in engagement with the shoulder and having a flange adjacent the shoulder, a piston mounted upon the reduced portion of the rod and having opposed faces, one opposed face being adjacent the tubular section, peripheral skirts extending in opposite directions outwardly from the opposed faces, and a plurality of circularly arranged parallel passages extending between the opposite faces, the regions of the said one opposite face adjacent some of the passages being relatively raised and adjacent the remaining passages being relatively depressed, the regions of the other opposite face adjacent the said remaining passages being relatively raised and adjacent the said some of the passages being relatively depressed, a first valve ring engaging and said one opposite face so as to close the said some of the passages and to leave open and yet completely overlie the said remaining passages, a second valve ring engaging the said other opposite face so as to close the said remaining passages and to leave open and yet completely overlie the said some of the passages, the piston having a first central raised portion at the said one opposite face engaging an end of the tubular section, the first valve ring being movable between the end of the tubular section and the said one opposite face, a first spring acting between the flange on the tubular section and the first valve ring to urge the first valve ring against the said one opposite face, a nut threaded on the reduced end of the rod and having a flange adjacent its outer end, the piston having a second central raised portion at the said other opposite face engaging the other end of the nut, the second valve ring being movable between the said other end of the nut and the said other opposite face of the piston, and a second spring acting between the flange on the nut and the second valve ring to urge the second valve ring against the said other opposite face of the piston.

4. A valve construction comprising a valve body having a first circle of passages extending therethrough, a second circle of passages extending therethrough in only partially overlapping relation with respect to the first circle of passages, high surfaces and low surfaces on one face of the valve body, respectively, adjacent the ends of the passages of the first circle and of the passages of the second circle, high surfaces and low surfaces on an opposite face of the valve body, respectively, adjacent the ends of the passages of the second circle and of the passages of the first circle, a first valve ring engaging the high surfaces at the said one face of the valve body so as to close the passages of the first circle and spaced from and only partially overlying the low surfaces at the said one face of the valve body so as to leave open the passages of the second circle, means resiliently urging the first valve ring against the valve body, a second valve ring engaging the high surfaces at the said opposite face of the valve body so as to close the passages of the second circle and spaced from and only partially overlying the low surfaces at the said opposite face of the valve body so as to leave open the passages of the first circle, and means resiliently urging the second valve ring against the valve body.

5. A valve construction comprising a valve body having two rings of passages extending therethrough from one face to an opposite face so as to overlap one another in each face of the valve body and having at the said one face elevated annular seating portions surrounding the passages of one ring and at the said opposite face elevated annular seating portions surrounding the passages of the other ring, a first ring valve engaging the elevated annular seating portions at the said one face so as to close the passages of the said one ring and so as to leave open the passages of the said other ring, means yieldingly maintaining the first valve in the aforesaid position, a second ring valve engaging the elevated annular seating portions at the said opposite face so as to close the passages of the said other ring and so as to leave open the passages of the said one ring, and means yieldingly maintaining the second valve in the aforesaid position.

6. A valve construction comprising a valve body having two overlapping rings of passages extending therethrough from one face to an opposite face and having at one face elevated annular seating portions surrounding the passages of one ring and at the opposite face elevated annular seating portions surrounding the passages of the other ring, a first circular valve engaging the elevated annular seating portions at the said one face and completely covering the passages of the said one ring so as to close the same and being spaced from and only partially covering the passages of the said other ring so as to leave the same open, means yieldingly maintaining the first valve in the aforesaid position, a second valve engaging the elevated annular seating portions at the said opposite face and completely covering the passages of the said other ring so as to close the same and being spaced from and only partially covering the passages of the said one ring so as to leave the same open, and means yieldingly maintaining the second valve in the aforesaid position.

7. A piston construction for a shock absorber comprising a piston body having a main portion, a central opening extending therethrough, hub extensions surrounding the opening at opposite faces of the main portion, and peripheral skirts extending from opposite faces of the main portion, the piston body being provided with a circular ring of passages extending between the opposite faces and at one opposite face elevated seats adjacent alternate passages and at the other opposite face elevated seats adjacent the remaining alternate passages, a first circular valve engaging the elevated seats at the said one opposite face so as completely to cover and to close the said alternate passages and being spaced from the said remaining alternate passage so as to leave them open although completely covering them, a second circular valve engaging the elevated seats at the said other opposite face so as completely to cover and to close the said remaining alternate passages and being spaced from the said alternate passages so as to leave them open although completely covering them, a piston rod having a reduced end provided with a threaded portion at its extremity and a shoulder between the threaded portion and the remainder, a tubular section mounted upon the reduced end of the piston rod in engagement with the shoulder and having an external flange at the end adjacent the shoulder, the piston body being mounted upon the reduced end of the piston with one hub extension abutting the other end of the tubular section, the said other end of the tubular section serving to limit the movement of one circular valve away from the elevated seats engaged by it, a first spring acting between the external flange on the tubular section and the said one circular valve to maintain the same yieldingly in engagement with the last mentioned elevated seats, a nut engaging the threaded portion of the reduced end of the piston rod with one end abutting the other hub extension of the piston body so as to limit the movement of the other circular valve away from the elevated seats engaged by it, the nut having at its other end a flange, and a second spring acting between the flange on the nut and the said other circular valve to maintain the same yieldingly in engagement with the last mentioned elevated seats.

8. A piston construction for a shock absorber comprising a piston body having a main portion, a central opening extending therethrough, hub extensions surrounding the opening at opposite faces of the main portion, and peripheral skirts extending from opposite faces of the main portion, the piston body being provided with two overlapping rings of passages extending between the opposite faces and at one opposite face elevated annular seats surrounding the passages of one ring and at the other opposite face elevated annular seats surrounding the passages of the other ring, a first circular valve engaging the elevated annular seats at the said one opposite face so as completely to cover and to close the passages of the said one ring and being spaced from and only partially covering the passages of the said other ring so as to leave the same open, a second circular valve engaging the elevated annular seats at the said other opposite face so as completely to cover and to close the passages of the said other ring and being spaced from and only partially covering the passages of the said one ring so as to leave them open, a piston rod having a reduced end provided with a threaded portion at its extremity and a shoulder between the threaded portion and the remainder, a tubular section mounted upon the reduced end of the piston rod in engagement with the shoulder and having an external flange at the end adjacent the shoulder, the piston body being mounted upon the reduced end of the piston with one hub extension abutting the other end of the tubular section, the said other end of the tubular section serving to limit the movement of one circular valve away from the elevated seats engaged by it, a first spring acting between the external flange on the tubular section and the said one circular valve to maintain the same yieldingly in engagement with the last mentioned elevated seats, a nut engaging the threaded portion of the reduced end of the piston rod with one end abutting the other hub extension of the valve body so as to limit the movement of the other circular valve away from the elevated seats engaged by it, the nut having at its other end a flange, and a second spring acting between the flange on the nut and the said other circular valve to maintain the same yieldingly in engagement with the last mentioned elevated seats.

9. A piston construction comprising a piston body having peripheral skirts extending from opposite faces, a central opening, and hub extensions surrounding the central opening and extending from the opposite faces, the piston body being provided with inner and outer overlapping rings of passages extending between the opposite faces and having at one opposite face elevated seating portions adjacent the passages of the outer ring and at the other opposite face elevated seating portions adjacent the passages of the inner ring, a first circular valve relatively closely fitting within the peripheral skirt at the said one opposite face and engaging the elevated seating portions adjacent the passages of the outer ring so as to cover them completely and to close them and being spaced from and only partially covering the passages of the inner ring so as to leave them open, means yieldingly maintaining the first circular valve in the aforesaid position, a second circular valve relatively closely fitting about the hub extension at the said other opposite face and engaging the elevated seating portions adjacent the passages of the inner ring so as to cover them completely and to close them and being spaced from and only partially covering the passages of the outer ring so as to leave them open, and means yieldingly maintaining the second circular valve in the aforesaid position.

10. A piston construction comprising a piston body having a peripheral skirt extending from one face, a central opening, and a hub extension surrounding the central opening and extending from the opposite face, the piston body being provided with inner and outer overlapping rings of passages extending between said faces and having at the said one face elevated seating portions adjacent the passages of the outer ring and at the said opposite face elevated seating portions adjacent the passages of the inner ring, a first circular valve relatively closely fitting within the peripheral skirt at the said one face and yieldingly engaging the elevated seating portions adjacent the passages of the outer ring so as to cover them completely and to close them and being spaced from and only partially covering the passages of the inner ring so as to leave them open, and a second circular valve relatively closely fitting about the hub extension at the said opposite face and yieldingly engaging the elevated seating portions adjacent the passages of the inner ring so as to cover them completely and to close them and being spaced from and only partially covering the passages of the outer ring so as to leave them open.

11. A piston valve body having a plurality of parallel passages extending therethrough and arranged in a ring, a first set of V-shaped depressions formed in one face of the piston valve body at certain alternate passages, and a second set of V-shaped depressions formed in the opposite face of the piston valve body at the remaining alternate passages, each set of depressions being V-shaped when viewed in a direction transverse to the face in which each set of depressions is formed.

12. A valve construction comprising a valve body having two at least partially overlapping circular rings of parallel passages extending therethrough from one face to an opposite face and having at one face first portions adjacent one ring of openings and second portions of a different level adjacent the other ring of openings and at the opposite face third portions adjacent the said one ring of openings and fourth portions of a different level adjacent the said other ring of openings, the level for the first portions at the one ring of openings being displaced from the level for the second portions at the other ring of openings in the same direction as the level for the third portion at the one ring is displaced from the level for the fourth portions at the other ring of openings, and circular valves upon the faces mentioned of the body controlling the open ends of the passages at the first portion and fourth portion levels and being spaced from and leaving open the open ends of the passages at the second portion and third portion levels.

13. A valve construction comprising a valve body having a first group of passages extending therethrough providing for fluid passage in one direction and a second group of passages extending therethrough providing for fluid passage in the opposite direction, said passages each having an inlet and a discharge outlet arranged whereby the inlets of the first group of passages are opposite the inlets of the second group and the discharge outlets of the respective groups are likewise opposite one another, both said groups of passages being disposed parallel to the central axis of the valve body and being in sufficient peripheral alignment to contain at least one common cylindrical path of revolution, a first rigid valve ring disposed at one end of the valve body and in juxtaposition to the discharge outlets of said first group of passages and a second rigid valve ring disposed at the opposite end of the valve body in juxtaposition to the discharge outlets of said second group of passages, each of said valve rings having portions thereof cooperating with the valve body at said discharge outlets to close the discharge outlets of its juxtaposed group of passages and each having other portions adjacent to but spaced with respect to the inlets of the other group of passages.

ROSS LEWTON.

REFERENCES CITED

The following references are of record in the file of this patent:

UNITED STATES PATENTS

| Number | Name | Date |
|---|---|---|
| 1,416,771 | Babson | May 23, 1922 |
| 2,316,924 | Whisler | Apr. 20, 1943 |
| 2,324,058 | Boor et al. | July 13, 1943 |

FOREIGN PATENTS

| Number | Country | Date |
|---|---|---|
| 506,687 | Great Britain | June 2, 1939 |
| 652,069 | France | 1928 |

Certificate of Correction

Patent No. 2,472,840. June 14, 1949.

ROSS LEWTON

It is hereby certified that error appears in the printed specification of the above numbered patent requiring correction as follows:

Column 6, line 24, claim 1, for the word "piston" read *body*;

and that the said Letters Patent should be read with this correction therein that the same may conform to the record of the case in the Patent Office.

Signed and sealed this 22nd day of November, A. D. 1949.

[SEAL]

THOMAS F. MURPHY,
*Assistant Commissioner of Patents.*